July 20, 1937.  J. H. HALT  2,087,666
MEASURING DEVICE
Filed June 3, 1936
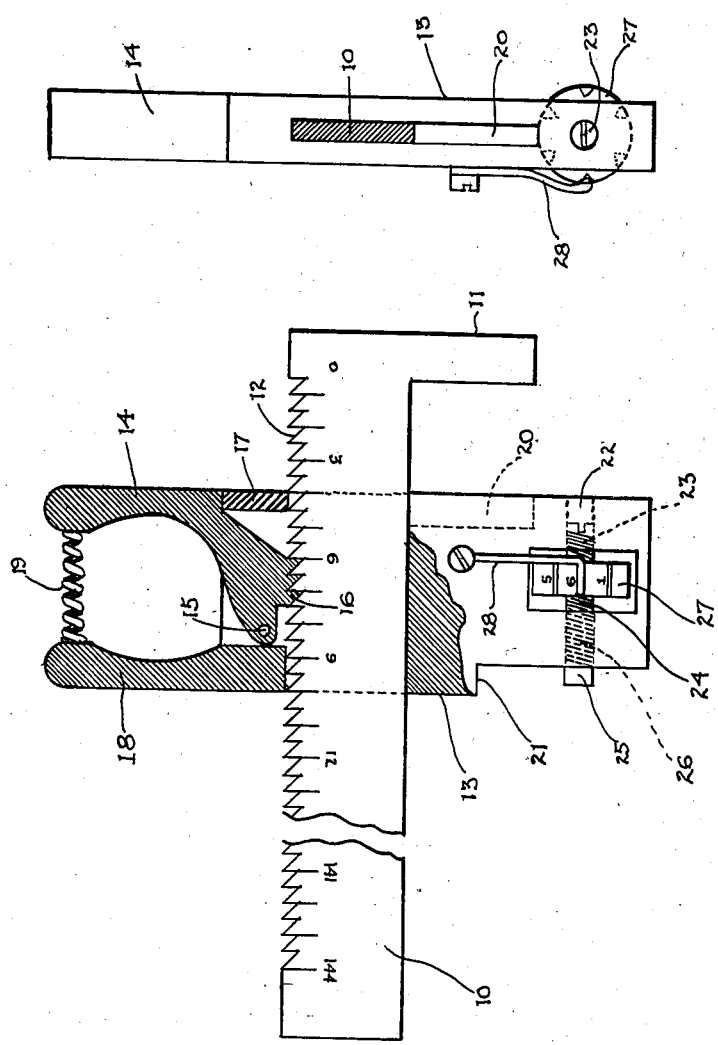
INVENTOR.
Joseph H. Halt
BY Hull Brock &west
ATTORNEY.

Patented July 20, 1937

2,087,666

UNITED STATES PATENT OFFICE 2,087,666

MEASURING DEVICE

Joseph H. Halt, Cleveland, Ohio

Application June 3, 1936, Serial No. 83,285

5 Claims. (Cl. 33—143)

This invention relates to a measuring device and is particularly adapted for measure setting and material measuring for single type casting machines, and material making machines, although adaptable for other uses.

It is at present customary for the manufacturers of these type casting machines to supply a plurality of type measures in the form of small blocks, a plurality of which may be selected for the purpose of establishing a particular measure and placed between relatively movable parts of the machine for gauging the distance of such parts from each other.

It is an object of the invention to provide a device in the nature of a caliper which may be used instead of such combination of block measures for more readily and quickly establishing a proper distance between the movable parts of the casting machine as referred to above.

With the foregoing and other objects in view, which will be in part apparent and in part pointed out hereinafter, the invention consists in the novel features of the construction and arrangements of parts hereinafter described and illustrated in the accompanying drawing wherein Fig. 1 is a fragmentary part sectional view showing one embodiment of my invention and Fig. 2 is a section taken through the beam at the right of the slide in Fig. 1 and looking toward the left.

In the drawing, the numeral 10 indicates a beam which is provided with a right angularly extending projection 11 extending from one side thereof and which is provided on the opposite side with notches 12 which may be graduated in suitable units. In the example shown, the graduations are in picas and half-picas. It is to be understood that other suitable units may be provided for particular uses.

Movable along the beam 10 is a slide indicated generally by the reference numeral 13. The slide 13 is provided with an opening for the reception of the beam 10 and receives within a portion thereof a detent 14 which is pivoted within the slide as indicated at 15 and provided with one or more teeth 16 adapted to be received within the notches 12 whereby to hold the slide 13 at a fixed position with respect to the beam 10. The detent 14 projects outwardly from within the slide 13 and terminates in a handle portion at its outer end. The slide 13 is provided with a stop element 17 which in the instance shown is integral and limits the clockwise rotation of the detent 14. Fixed with respect to the slide 13 and forming a part thereof is a handle element 18 extending generally parallel in relation with the handle portion of the detent 14 so that a coil spring 19 interposed between the upper ends of the portions 14 and 18 may result in urging portion 14 against the stop 17 whereby to hold the detent in notch engaging position.

Formed in the slide 13 adjacent the back of the beam 10 is a recess 20 which, as is clear from the drawing, is of a length to receive the projection 11 therewithin and of a depth to receive a considerable portion of such projection whereby relatively small measures may be effected. At the side of the slide 13 opposite the recess 20 is a notched out corner presenting a face parallel with the right hand face of the projection 11 and through a bore 22 of which projects a threaded element 23 terminating in a working or machine engaging tip 25. The bore 22 is threaded at the left of the central opening as indicated at 26 while the threaded element 23 is provided with threads as indicated at 24, either throughout its length or at the left hand end only according to choice. This element is herein shown as being threaded throughout its length but it is to be understood that the threads at the right of the hand wheel 27 may be omitted. The hand wheel 27 is provided with notches adapted to receive yieldably a spring detent 28 and is graduated so that rotation from one notch to the next may represent a definite portion of one unit on the beam 10. As will be clear from the drawing, the hand wheel 27 is received within an opening extending through the slide and the element 25 is positioned at a greater distance from the back of the beam 10 than the end of the projection 11.

It will also be clear that the lower end of the slide 13, that is, the end most remote from the back of the beam 10, is parallel to such beam 10 and of considerable extent beyond projection 11, whereby the same may be placed against a flat surface and act to position the beam 10 parallel with the surface against which such edge of the slide engages. This insures that the measurement between a side face of projection 11 and tip 25 is along a line parallel to the flat surface against which the end of slide 13 is placed.

While I have shown and described the present preferred embodiment of my invention and the manner of use thereof, I am aware that the same may be realized in somewhat varying constructions and accordingly I do not wish to be limited except in accordance with the appended claims and the prior art.

Having thus described my invention, what I claim is:

1. In a device of the class described, a notched, graduated beam having a right angularly extending projection at one end thereof, and a slide movable along said beam and provided with releasable means for holding it in fixed relation to said beam, said slide extending perpendicular to said beam and terminating in an extended surface parallel to such beam and beyond the end of such projection, said slide having a recess in the edge thereof adjacent said projection, in alignment with such projection and adapted to receive such projection partially therewithin.

2. In a device of the class described, a notched, graduated beam having a right angularly extending projection at one end thereof, and a slide movable along said beam and provided with releasable means for holding it in fixed relation to said beam, said slide extending perpendicular to said beam and terminating in an extended surface parallel to such beam, said slide also being provided with an auxiliary adjustment comprising a threaded element received in a threaded opening in said slide and extending therefrom parallel to said beam and carrying a calibrated, notched wheel, and yieldable means for holding said wheel in adjusted position.

3. In a device of the class described, a notched, graduated beam having a right angularly extending projection at one end thereof, and a slide movable along said beam and provided with releasable means for holding it in fixed relation to said beam, said slide extending perpendicular to said beam and terminating in an extended surface parallel to such beam and beyond the end of such projection, said slide also being provided with an auxiliary adjustment comprising a threaded element received in a threaded opening in said slide and extending therefrom parallel to said beam and carrying a calibrated, notched wheel, and yieldable means for holding said wheel in adjusted position.

4. In a device of the class described, a notched, graduated beam having a right angularly extending projection at one end thereof, and a slide movable along said beam and provided with releasable means for holding it in fixed relation to said beam, said slide extending perpendicular to said beam and terminating in an extended surface parallel to such beam and beyond the end of such projection, said slide having a recess in the edge thereof adjacent said projection, in alignment with such projection and adapted to receive such projection partially therewithin, said slide also being provided with an auxiliary adjustment comprising a threaded element received in a threaded opening in said slide and extending therefrom parallel to said beam and carrying a calibrated, notched wheel, and yieldable means for holding said wheel in adjusted position.

5. In a device of the class described, a notched, graduated beam having a right angularly extending projection at one end thereof, and a slide movable along said beam and provided with releasable means for holding it in fixed relation to said beam, said slide extending perpendicular to said beam and terminating in an extended surface parallel to such beam, said slide also being provided with an auxiliary adjustment comprising a threaded element received in a threaded opening in said slide and extending therefrom parallel to said beam and carrying a calibrated, notched wheel, and yieldable means for holding said wheel in adjusted position, said threaded element being positioned beyond the end of said projection.

JOSEPH H. HALT.